United States Patent [19]

Dyer

[11] Patent Number: 6,160,028
[45] Date of Patent: Dec. 12, 2000

[54] FLAME RETARDANT MICROPOROUS POLYMERIC FOAMS

[75] Inventor: John Collins Dyer, Cincinnati, Ohio

[73] Assignee: The Procter & Gamble Company, Cincinnati, Ohio

[21] Appl. No.: 09/118,613

[22] Filed: Jul. 17, 1998

[51] Int. Cl.$^7$ ..................................................... C08J 9/28
[52] U.S. Cl. ............................ 521/64; 521/63; 604/369; 604/358
[58] Field of Search ....................................... 521/64, 63

[56] References Cited

U.S. PATENT DOCUMENTS

| | | | |
|---|---|---|---|
| 3,255,127 | 6/1966 | von Bonin et al. | 260/2.5 |
| 3,256,219 | 6/1966 | Will | 260/2.5 |
| 3,431,911 | 3/1969 | Meisel, Jr. | 128/287 |
| 3,563,243 | 2/1971 | Lindquist | 128/287 |
| 3,565,817 | 2/1971 | Lissant | 252/312 |
| 3,640,753 | 2/1972 | Krauch et al. | 117/62.2 |
| 3,734,867 | 5/1973 | Will | 260/2.5 R |
| 3,763,056 | 10/1973 | Will | 260/2.5 L |
| 3,778,390 | 12/1973 | Ulrich, Jr. | 250/2.5 AN |
| 3,806,474 | 4/1974 | Blair | 260/2.5 AG |
| 3,988,508 | 10/1976 | Lissant | 526/344 |
| 3,993,074 | 11/1976 | Murray et al. | 128/286 |
| 3,994,298 | 11/1976 | DesMarais | 128/285 |
| 4,029,100 | 6/1977 | Karami | 128/284 |
| 4,049,592 | 9/1977 | Marans et al. | 260/2.5 AD |
| 4,061,145 | 12/1977 | DesMarais | 128/275 |
| 4,067,832 | 1/1978 | DesMarais | 260/2.5 A |
| 4,093,570 | 6/1978 | Miyake et al. | 260/2.5 B |
| 4,110,276 | 8/1978 | DesMarais | 521/123 |
| 4,132,839 | 1/1979 | Marans et al. | 521/159 |
| 4,262,052 | 4/1981 | Kannan et al. | 428/306 |
| 4,376,440 | 3/1983 | Whitehead et al. | 604/387 |
| 4,394,930 | 7/1983 | Korpman | 220/444 |
| 4,425,130 | 1/1984 | DesMarais | 604/389 |
| 4,473,611 | 9/1984 | Haq | 428/198 |
| 4,522,953 | 6/1985 | Barby et al. | 521/64 |
| 4,536,521 | 8/1985 | Haq | 521/146 |
| 4,540,717 | 9/1985 | Mahnke et al. | 521/52 |
| 4,554,297 | 11/1985 | Dabi | 521/178 |
| 4,603,069 | 7/1986 | Haq et al. | 428/76 |
| 4,606,958 | 8/1986 | Haq et al. | 428/68 |
| 4,611,014 | 9/1986 | Jones et al. | 521/146 |
| 4,612,334 | 9/1986 | Jones et al. | 521/146 |
| 4,613,543 | 9/1986 | Dabi | 428/304.4 |
| 4,668,709 | 5/1987 | Jones et al. | 521/146 |
| 4,724,242 | 2/1988 | Vassileff | 521/83 |
| 4,725,628 | 2/1988 | Garvey et al. | 521/137 |
| 4,731,391 | 3/1988 | Garvey | 521/137 |
| 4,740,528 | 4/1988 | Garvey et al. | 521/128 |
| 4,775,655 | 10/1988 | Edwards et al. | 502/416 |
| 4,788,225 | 11/1988 | Edwards et al. | 521/147 |
| 4,797,310 | 1/1989 | Barby et al. | 428/71 |
| 4,839,395 | 6/1989 | Masamizu et al. | 521/56 |
| 4,957,810 | 9/1990 | Eleouet et al. | 428/306.6 |
| 4,959,341 | 9/1990 | Wallach | 502/404 |
| 4,961,982 | 10/1990 | Taylor | 428/41 |
| 4,965,289 | 10/1990 | Sherrington et al. | 521/53 |
| 4,966,919 | 10/1990 | Williams, Jr. et al. | 521/54 |
| 4,972,002 | 11/1990 | Volkert | 521/120 |
| 4,973,610 | 11/1990 | Hahn et al. | 521/89 |
| 4,985,467 | 1/1991 | Kelly et al. | 521/52 |
| 4,985,468 | 1/1991 | Elmes et al. | 521/63 |
| 4,990,541 | 2/1991 | Nielsen et al. | 521/70 |
| 4,992,254 | 2/1991 | Kong | 423/449 |
| 5,021,462 | 6/1991 | Elmes et al. | 521/63 |
| 5,034,424 | 7/1991 | Wenning et al. | 521/109.1 |
| 5,037,859 | 8/1991 | Williams, Jr. et al. | 521/55 |
| 5,047,225 | 9/1991 | Kong | 423/447.2 |
| 5,065,752 | 11/1991 | Sessions et al. | 128/156 |
| 5,066,684 | 11/1991 | LeMay | 521/64 |
| 5,066,784 | 11/1991 | Sherrington et al. | 530/334 |
| 5,110,838 | 5/1992 | Tokiwa et al. | 521/81 |
| 5,116,880 | 5/1992 | Tokiwa et al. | 521/134 |
| 5,116,883 | 5/1992 | LeMay | 521/178 |
| 5,128,382 | 7/1992 | Elliott, Jr. et al. | 521/178 |
| 5,134,007 | 7/1992 | Reising et al. | 428/78 |
| 5,134,171 | 7/1992 | Hammel et al. | 521/98 |
| 5,147,345 | 9/1992 | Young et al. | 604/378 |

(List continued on next page.)

FOREIGN PATENT DOCUMENTS

| | | | |
|---|---|---|---|
| 0 017 671 A1 | 10/1980 | European Pat. Off. | C08J 9/14 |
| 0 017 672 A1 | 10/1980 | European Pat. Off. | C08J 9/00 |
| 0 049 768 A1 | 4/1982 | European Pat. Off. | C08J 9/00 |
| 0 068 830 A1 | 1/1983 | European Pat. Off. | A61L 15/00 |
| 0 299 762 | 1/1989 | European Pat. Off. | C08F 2/32 |
| 0 480 379 A2 | 4/1992 | European Pat. Off. | C08G 59/50 |
| 1340520 | 9/1963 | France . | |
| 3 109 929 A1 | 1/1982 | Germany | C08J 9/12 |
| 2-239863 | 9/1990 | Japan | A61F 13/15 |
| 2-289608 | 11/1990 | Japan | C08G 18/48 |
| 3-49759 | 3/1991 | Japan | A61F 13/15 |
| 1 493 356 | 11/1977 | United Kingdom | C08J 9/28 |
| 2 188 055 | 9/1987 | United Kingdom | C08G 18/14 |
| WO 94/28839 | 12/1994 | WIPO | A61F 13/15 |

OTHER PUBLICATIONS

Lissant et al., "Structure of High Internal Phase Ratio Emulsions", Journal of Colloid & Interface Science, vol. 47, No. 2, pp. 416–423, (May 1974).

Lissant et al., "A Study of Medium and High Internal Phase Ratio Water/Polymer Emulsions", Journal of Colloid & Interface Science, vol. 42, No. 1, pp. 201–108, (Jan. 1973).

Lissant, K.J., "The Geometry of High–Internal–Phase Ratio Emulsions", Journal of Colloid & Interface Science, vol. 22, No. 5, pp. 462–468, (Nov. 1966).

Aubert et al., "Low Density, Microcellular Polystyrene Foams", Polymer, V 26, pp. 2047–2054, (1985).

(List continued on next page.)

Primary Examiner—Morton Foelak
Attorney, Agent, or Firm—Carl J. Roof; Mary Catherine Hentz; Edward J. Milbrada

[57] ABSTRACT

Disclosed are microporous, open-celled polymeric foams formed by polymerizing a high internal phase water-in-oil emulsion comprising a continuous oil phase and discontinuous water phase where the foam has a Limiting Oxygen Index (LOI) value of at least about 18% Such foams are commonly known in the art as "HIPEs". The foams have a variety of flame retardant applications, including use in insulation.

17 Claims, 2 Drawing Sheets

U.S. PATENT DOCUMENTS

| | | | |
|---|---|---|---|
| 5,149,720 | 9/1992 | DesMarais et al. | 521/63 |
| 5,189,070 | 2/1993 | Brownscombe et al. | 521/64 |
| 5,198,472 | 3/1993 | DesMarais et al. | 521/63 |
| 5,200,433 | 4/1993 | Beshouri | 521/64 |
| 5,210,104 | 5/1993 | Bass et al. | 521/64 |
| 5,210,108 | 5/1993 | Spinu et al. | 521/182 |
| 5,221,726 | 6/1993 | Dabi et al. | 528/93 |
| 5,250,579 | 10/1993 | Smits et al. | 521/98 |
| 5,252,619 | 10/1993 | Brownscombe et al. | 521/64 |
| 5,260,345 | 11/1993 | DesMarais et al. | 521/148 |
| 5,268,224 | 12/1993 | DesMarais et al. | 428/286 |
| 5,276,067 | 1/1994 | Doerge | 521/131 |
| 5,290,820 | 3/1994 | Brownscombe et al. | 521/64 |
| 5,318,554 | 6/1994 | Young et al. | 604/378 |
| 5,336,208 | 8/1994 | Rosenbluth et al. | 604/329 |
| 5,336,695 | 8/1994 | Nass et al. | 521/109.1 |
| 5,352,711 | 10/1994 | DesMarais | 521/149 |
| 5,387,207 | 2/1995 | Dyer et al. | 604/369 |
| 5,633,291 | 5/1997 | Dyer et al. | 521/64 |
| 5,753,359 | 5/1998 | Dyer et al. | 428/315.5 |
| 5,817,704 | 10/1998 | Shiveley et al. | 521/63 |
| 5,922,780 | 7/1999 | Dyer et al. | 521/64 |

OTHER PUBLICATIONS

LeMay, J.D., "Mechanical Structure Property Relationships of Microcellular, Low Density Foams", Mat. Res. Soc. Symp. Proc., vol. 207, pp. 21–26, (1991).

Weber et al., "New Melamine–based Elastic Foam", Kunststoffe German Plastics, pp. 843–848, (Nov. 1985).

Young et al., "Preparation of Multishell ICF Target Plastic Foam Cushion Materials by Thermally Induced Phase Inversion Processes", J. Vac. Sci. Technol., vol. 20, No. 4, pp. 1094–2004, (Apr. 1982).

Gibson et al., "The Mechanics of Foams: Basic Results" and "The Mechanics of Foams: Refinements", Cellular Solids Structure & Properties, Chpts. 5 & 6, pp. 120–200, (1988).

Aerogels, Jochenm Fricke, pp. 92–97.

Bhumgara, B., "Polymeric Foam Materials on Filtration Media", Filtration and Separation (Mar. 1995), p 245–251.

Williams, J.W., "High Internal Phase Water–In–Oil Emulsions: Influence of Surfactants and Cosurfactants on Emulsion Stability and Foam Quality", Langmuir, vol. 7, No. 7, pp. 1370–1377 (Jan. 1991).

Kong, F–M., et al. "Summary Abstract: Low–density polystyrene foam materials for direct–drive last inertial confinement fusion targets", J. Vac. Sci. Tech. A., vol. 6, No. 3, pp. 1894–1895 (May/Jun. 1988).

Hainey, P., et al., "Synthesis and Ultrastrutural Studies of Styrene–Divinylbenzene Polyhipe Polymers", Macromolecules, vol. 24, No. 1, pp. 117–121 (1991).

Oertel, G. "Cellular Solids. Structure and Properties", Polyurethane Handbook, Hanser Publishers, (1985), and Gibson, L. J.; Ashby, M. F. Pergamon Press (1988).

Lyons, J., The Chemistry and Uses of Fire Retardants, (ISBN 0–89874–767–8) Robert Krieger Publishing Co., Chpt. 1, pp. 1–28 (1987).

FLAME RETARDANT MICROPOROUS POLYMERIC FOAMS

FIELD OF THE INVENTION

This application relates to microporous, opencelled polymeric foams which are resistant to burning.

BACKGROUND OF THE INVENTION

The development of microporous foams has been the subject of substantial commercial interest. The properties of these foams can be varied to advantage for applications ranging from thermal, acoustic, electrical, and mechanical (e.g., for cushioning) insulators, absorbent materials, filters, carriers for inks, dyes, lubricants, and lotions, making items buoyant, and the like. References describing such uses and properties of foams include Oertel, G. "Polyurethane Handbook" Hanser Publishers, Munich, 1985, and Gibson, L. J.; Ashby, M. F. "Cellular Solids. Structure and Properties" Pergamon Press, Oxford, 1988. The term "insulator" refers to any material which reduces the transfer of energy from one location to another. The term "absorbent" refers to materials which imbibe and hold or distribute fluids, usually liquids, often water, an example being a sponge. The term "filter" refers to materials which pass a fluid, either gas or liquid, while retaing impurities within the material. The term "carrier" refers to materials which hold a second substance, usually a liquid, until such time as the second substance is needed for a separate purpose at which point it is expressed by pressure.

Many of these applications require foam which resists burning. Many building codes, for example, include restrictions on the flammability of materials including foam insulation. Similar restrictions can apply to insulation used in clothing or protective apparel. However, most plastic materials, including foams, burn readily. In order to provide for the safe use of such materials in these applications, various approaches to retarding the flammability of organic polymers have been developed. These approaches are discussed generally by John Lyons in the book "The Chemistry and Uses of Fire Retardants", Robert Krieger Publishing Co., Malabar, FL, 1987. These approaches are diverse but generally comprise inclusion of compounds containing certain heteroatoms—generally chlorine, bromine, phosphorus, boron, and/or antimony in the organic polymer. These compounds include small molecules, oligomers, and polymers. Inorganic additives are also used, including antimony trioxide and related salts as well as salts containing borate or phosphate anions. The science of flame retardancy as applied to conventional plastic materials is reasonably well developed, as discussed in the cited text.

Additional properties of the foam are often required depending on the intended use. These generally include one or more of the following: (1) low density, (2) flexibility, (3) strength (compressive and tensile), (4) openness, and (5) control of morphology. Low density foams are more efficient since most uses require a certain volume. A low density foam will impose less mass to meet this objective. Flexible foams are typically generated by maintaining a relatively low glass transition temperature ("Tg") of the foam. Strength is a parameter which can be challenging to achieve concurrent with lower Tg and/or lower density. Strength (independent of density) is most effectively generated by including crosslinking agents which link the polymeric chains of the foam together in a fashion which confers a degree of resistance to deformation and the ability to recover from deformation, e.g., elasticity. Openness and morphology are controlled principally by the method of foam formation and curing.

One of the benefits of high internal phase emulsions foams or HIPEs is that the foams can be tailored to have one or more of the desired properties discussed above. The conference of flame retardancy to HIPE foams is not straightforward. However, it would be desirable to be able to make an open-celled, high surface area HIPE foam which is flame retardant and which has one or more of the following properties: (1) the lowest density consistent with the other requirements imposed on the foam; (2) flexibility; (3) strength; (4) a generally open-celled structure; and (5) the ability to be manufactured so as to control the size of cells produced within the foam.

SUMMARY OF THE INVENTION

The present invention relates to a flame-retardant, open-celled polymeric foam formed by polymerizing a high internal phase water-in-oil emulsion, wherein the foam has an Limited Oxygen Index ("LOI") value of at least about 18%. These polymeric foams are prepared by polymerization of certain water-in-oil emulsions having a relatively high ratio of water phase to oil phase, commonly known in the art and referred to herein as high internal phase emulsions, or "HIPEs." As used herein, polymeric foams which result from the polymerization of such emulsions are referred to hereafter as "HIPE foams".

The foams of the present invention are prepared via polymerization of a HIPE comprising a discontinuous water phase and a continuous oil phase wherein the ratio of water phase to oil phase (hereinafter referred to as "W:O ratio") is at least about 3:1. The water phase generally contains an electrolyte and a water soluble initiator. The oil phase generally contains substantially water-insoluble monomers polymerizeable by free radicals, an emulsifier, and other optional ingredients such as synergists, antioxidants, fillers, dyes, fluorescers, Ultra Violet ("UV") absorbers, opacifying agents, etc. The monomers can be selected so as to confer the properties desired in the resulting polymeric foam which typically include low density, a glass transition (Tg) between about −40° and 90° C., mechanical integrity sufficient for the intended end use, and an open-celled, microporous morphology.

DETAILED DESCRIPTION OF THE INVENTION

I. HIPE FOAM CHARACTERISTICS

Figure 1:
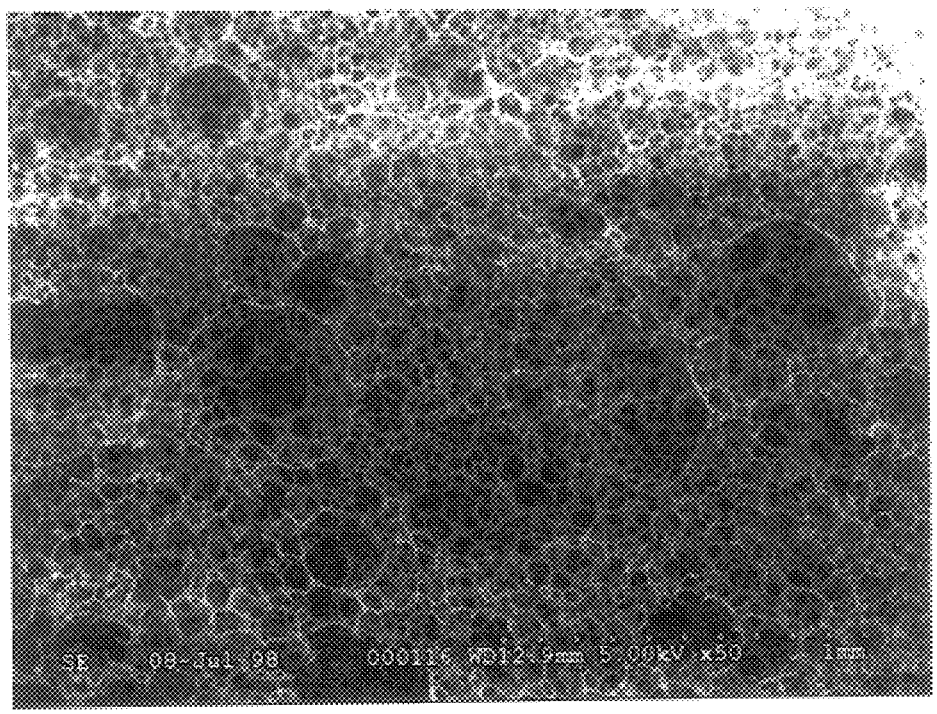
FIG. 1 of the drawings is a photomicrograph (50× magnification) of a cut section of a representative polymeric foam useful in the present invention made according to Example 1 (A) disclosed herein. The foam has an Limited Oxygen Index ("LOI") value of 26.9% and a density of 25 mg/cc and consists of 77% of the flame retardant monomer chloroprene, 3% antimony trioxide, and 20% of divinyl benzene.
Figure 2:
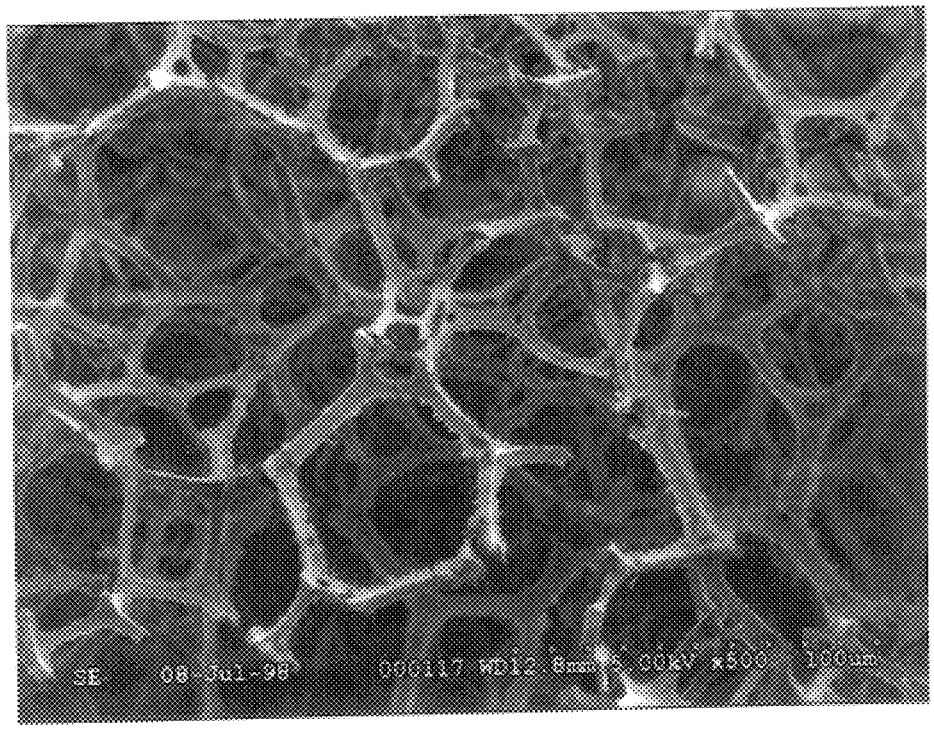
FIG. 2 of the drawings is a photomicrograph (500× magnification) of the foam of FIG. 1.
Figure 3:
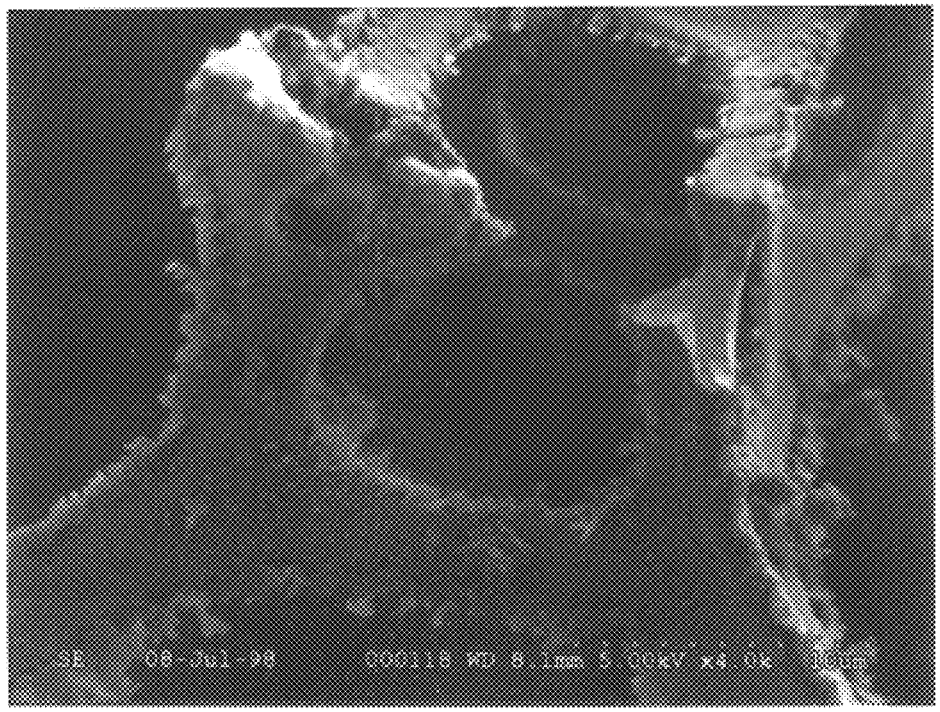
FIG. 3 and FIG. 4 of the drawings are photomicrographs (4000× magnification) of the foam of FIG. 1.
Figure 4:
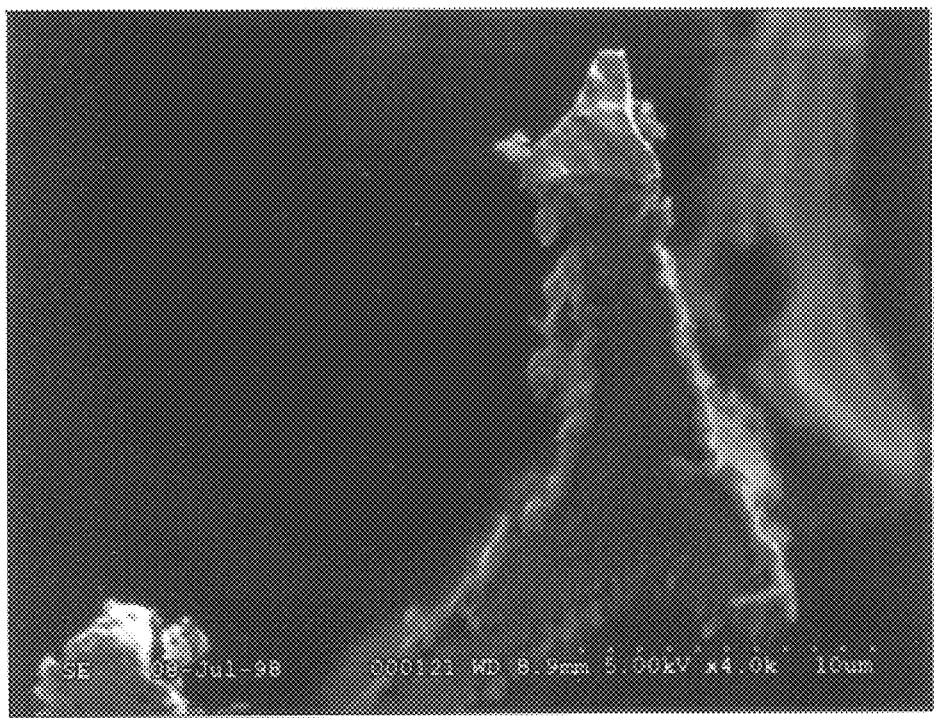

HIPE foams of the present invention are comprised of specific combinations of monomers which to a large extent control the ultimate properties of the foam. The types of monomers used fall into the following three general categories: (1) monomers which help maintain a desirable Tg in the resulting polymer, (2) monomers which help confer "toughness" to the resulting polymer, herein referred to as "toughening monomers", and (3) monomers which have di-, tri-, tetra-, and higher functionality useful in conferring crosslinks within the resulting polymer, herein referred to as crosslinkers. These crosslinks are particularly critical in achieving the desired compressive strength or modulus and/or elasticity which is required for many foam applications. Comonomers which confer strength while lacking sufficient molecular flexibility tend to increase Tg. Examples include divinyl benzene, a crosslinker wherein higher levels may increase the strength of the polymer while also increasing the Tg. Tg is usually important to the use of any polymer. While in some uses a relatively high Tg may be desired, many uses require a degree of flexibility which requires a lower Tg which in general is more difficult to attain via formulation than a higher Tg. Also, with HIPE derived foams, the dewatering process can be significantly complicated in the event of a very high Tg foam (>100° C.).

It will be recognized that in some instances, it is not necessary to use all of the monomer types described above. Indeed, in a preferred embodiment of the present invention, where monomers that confer flame retardancy are copolymerized to form the desired foam, it may not be necessary to use distinct monomers in categories (1) and (2). In such embodiments, the monomer which confers flame retardancy may also serve the functions of maintaining Tg and providing the requisite toughness.

II. FLAME RETARDANCY

The HIPE foams of the present invention are flame retardant polymeric foams. A technique for measuring the flame retardancy of materials is the Limiting Oxygen Index technique (hereinafter referred to as "LOI"). This technique is described in detail below. While other techniques for measuring flame retardancy are known, a "flame retardant" polymeric foam, as referred to herein, has an LOI value of at least about 18%. With respect to the polymeric foams, the term "flame retardant", as used herein, refers to the foams themselves. With respect to additives, ingredients, components, agents, monomers, polymers, and the like, the term "flame retardant", as used herein, refers to the ability of the additive, etc. to confer flame retardancy to the polymeric foam. Such flame retardant additives, etc. are also referred to herein as "materials conferring flame retardancy".

Flame retardant additives are widely available commercially for use with many polymer types. Generally, materials conferring flame retardants make use of the elements bromine, chlorine, phosphorus, antimony, and/or boron, and less frequently, elements including silicon, aluminum, sulfur, and selenium in a stable molecule that is incorporated into a plastic at some convenient stage of processing. However, the conference of flame retardancy to the HIPE foams of the present invention is not straightforward. Unlike, for example, polystyrene foams such as Styrofoam™, the foams of the present invention are not thermoplastic. Thus, flame retardant additives may not be included in a melt phase prior to formation of the foam. Similarly, in contrast to, for example, blown polyurethane foams, these materials conferring flame retardancy may not be simply included in a starting organic phase which is gas blown to form the foam structure.

The inclusion of a material conferring flame retardancy in the manufacture of HIPE foams must take place either pre-emulsification, post-emulsification but prior to polymerization, or by post-treatment of the already formed foam. Inclusion in either the oil phase or the aqueous phase pre-emulsification is constrained by the necessity to maintain emulsion stability during polymerization, to have compatibility with free radical polymerization, and the desire to avoid any negative impact on the desired mechanical properties of the resulting foam. Also, the material conferring flame retardancy must itself survive with its basic function intact through this processing. Addition to the emulsion prior to polymerization must additionally be done so as to ensure relatively efficient dispersal throughout the emulsion while maintaining emulsion stability. Inclusion by application to the finished foam requires a method suitable for addition of the required agents which ensures adequate homogeneity of application. Many such processes as applied to HIPE foams can be impractical at scale. Most flame retardant additives are water insoluble, necessitating application either as a solution in some organic solvent or via a separate emulsion. All three approaches, while typically feasible and within the scope of the present invention, may therefore be limited depending on the specifics and scale of production.

In balance, inclusion of the material conferring flame retardancy in the oil phase prior to emulsification is found to be most practicable. However, this limits the range of flame retardant additives that can be employed for some of the reasons stated in the preceding paragraph. In general, organic compounds including polymers as well as small molecules which include the elements bromine, chlorine, boron, and/or phosphorus and which are substantially insoluble in water and substantially unreactive during free radical polymerization, are found to have utility in this regard. While inclusion in the oil phase is often most practical, any combination of the above general procedures may be used to confer the desired level of flame retardancy while achieving the other properties required of the HIPE foam.

The flame retardant treatment should not alter undesirably the thermomechanical properties of the foam in a way that cannot be compensated conveniently by other means. For example, exclusion of the alkyl acrylate group as a Tg lowering monomer (which is preferred as discussed below) makes production of a low Tg foam relatively challenging. Inclusion especially of phosphate esters in the oil phase (or by post-formation application) can lower the Tg of the foam due to plasticization. This effect is relatively easily countered by including more of the Tg toughening or crosslinking monomers such as styrene or divinyl benzene ("DVB").

The specific nature of the material conferring flame retardancy is highly varied as discussed in Lyons (supra). Generally, flame retardant additives contain some level of halogen (preferably bromine or chlorine), phosphorus (often as an alkyl phosphate ester), boron, and/or antimony. Often, a flame retardant additive can include two or more of these elements, as with, for example, tris[1,3-dichloropropyl] phosphate, which includes both halogen (Cl) and phosphorus (P). Antimony is most often used as antimony trioxide, a generally poorly soluble inorganic salt. It has been found that this salt works primarily as a synergist for other flame retardants, especially those containing halogens. While not being bound by theory, it is believed that this adjuvant reacts with the halogens present from the flame retardant to produce antimony trihalide in situ. The use of synergists such as antimony compounds is discussed in detail below.

Though the mechanism of retardancy is not understood in all aspects, it is believed that the retardant is responsible for generating radicals in the vapor phase above the heated polymer. These radicals may then combine with more reactive radicals present and generated by the flame itself. This can serve to quench the more reactive components in the incandescent vapor phase, lowering the temperature, and thus eliminiating incandescence. Flame retarded organic polymers are not necessarily more stable when heated and will often char (a feature which can advantageously inhibit burning) and/or liberate excessive smoke. However, these processes typically do not contribute to the propagation or spread of a flame originated by heat, spark, fire, radiant energy, etc. As discussed above, it is preferred that the polymer being retarded have a relatively high level of stability when heated so as not to depolymerize and produce volatile, flammable gas (depolymerized monomer) in the air above the polymer. Depolymerization is often associated with the ceiling temperature of a polymer (or copolymer), Tc. Generally polymers having branching on the main chain (e.g., polymethyl methacrylate or poly($\alpha$-methyl styrene) have comparatively low ceiling temperatures. This generally carries into copolymers made with these monomers. It has been found generally that (co)polymers having low ceiling temperatures are more difficult to retard with respect to flammability. Hence, such monomers are preferably avoided. While alkyl acrylates such as 2-ethylhexyl acrylate ("EHA") are not known to have particularly low Tc values, they have been found in the development of this invention to complicate efforts to reduce the flammability of the HIPE foams described herein. For example, HIPE foams which contain alkyl acrylates will generally require higher levels of flame retardant additive of whatever type to achieve the desired level of retardancy. The replacement of this monomer type with other types which not only serve a Tg lowering function but which also reduce flammability may be beneficial.

The following discusses the different modes by which flame retardant ingredients may be conferred to the HIPE foams without interfering with key aspects of the process (e.g., curing, emulsification, property development, etc.).

A. Modes Of Conferring Flame Retardancy
i). Copolymnerizable Monomers

The most preferred method of inclusion of the material conferring flame retardancy is as a copolymerizable monomer included in the oil phase of the HIPE. This comprises a monomer reactive with the other comonomers in free radical polymerization wherein said monomer contains at least one of the following elements: Cl, Br, P, B, or Sb. The requirement for polymerization necessitates the presence of at least one reactive double bond as is well known to those skilled in the art. Copolymerization of the flame retardant additives avoids premature volatilization of the flame retardant as the polymeric foam heats up during actual fire conditions. If the flame retardant is driven off by heat of a proximate fire prior to ignition, obviously little or no flame retardant activity will remain when ignition temperature is reached. Also, in some applications, for example involving exposure to organic solvents, a flame retardant that is not covalently bound can be extracted from the foam, again eliminating its activity. Further, in some applications, the foam may be exposed to environmental heat conditions, e.g., the interior of an automobile, that may lead to volatilization of the flame retardant.

An example of a polymerizable material conferring flame retardancy used to make blown polyurethane foams is provided in WO 97/44368 (Willkomm and Hinze) filed May 23, 1996. These flame retardant additives, however, are not suited for HIPE foams as they function only for condensation polymerzations such as is typical of polyurethane formation. Nonlimiting examples of flame retardant monomers which are substantially water insoluble, do not interfere with free radical polymerization, and which are incorporated by free radical polymerization into the network of a HIPE foam include 2-chloro-1,3-butactiene (hereinafter "chloroprene"), 2,3-dichloro-1,3-butadiene (hereinafter "dichloroprene"), isomers of chlorostyrene, dichlorostyrene, and trichlorostyrene, octachlorostyrene, pentabromophenyl acrylate and methacrylate, isomers of bromostyrene, dibromostyrene, and tribromostyrene, 1,3-dibromopropyl acrylate, 2,4,6-tribromophenyl acrylate, 2-bromo-1,3-butadiene (hereinafter "bromoprene"), 2,3-dibromo-1,3-butadiene (hereinafter "dibromoprcne"), 3-6-dichloro-1,3,7-octatricne, vinyldipropyl phosphate, vinyl diphenyl phosphate, tris[styryl]phosphate, vinyl chloride, vinylidene chloride, vinyl bromide, vinylidene bromide, divinyl phenyl phosphate, 2,3-dibromobutan-1,4-diol diacrylate, chlorodivinyl benzene, general brominated and chlorinated alkyl acrylates, diacrylates, triacrylates, tetraacrylates and the corresponding methacrylates, acrylamides, methacrylamides, acrylonitriles, methacrylonitriles, other halogenated styrenics, and related compounds which have the requisite reactive double bond and flame retardant element(s).

The inclusion of such polymerizable materials conferring flame retardancy or flame retardant monomers as discussed above at levels above a few percent (which is required in general for sufficient efficacy) may have a significant effect on the thermomechanical properties of the polymer. For example, addition of a monomer such as 4-chlorostyrene necessitates reduction of the levels of other monomers in the formulation which are intended to maintain a desirable low Tg, e.g., 2-ethylhexyl acrylate (EHA). The result can be a foam which has good flame retardancy but thermomechanical properties outside what is desired for the end use and/or for processing. In this event, inclusion of flame retardant monomers which also serve to reduce the Tg of the resulting foam can be highly desirable. Examples of such types include chloroprene, bromoprene, dichloroprene, dibromoprene, and brominated alkyl acrylates having fairly long alkyl chains, typically having at least 4 carbons on the chain attached to the ester moiety. Particularly preferred examples include chloroprene and dichloroprene,.

ii). Non-Covalently Blended Polymers

Another preferred method is to include non-covalently blended polymers in the 35 emulsion. These polymers are included in the oil phase prior to emulsification and are a separate polymer which contains one or more of the elements Cl, Br, P, B, or Sb. Such polymers are basically inert during the polymerization step and are not covalently bonded into the forming polymer network. Due to the generally poor solubility of one polymer dispersed within another, these polymers will often phase separate and form regions within the other polymer of relatively pure blended polymer. Since polymers are generally non-volatile, this approach also avoids premature volatilization of the flame retardant additive as the polymer system is heated. However, this approach can be less efficient as the unreacted polymer does not typically augment the mechanical properties of the resulting foam as well as a reactive monomer incorporated covalently into the polymeric network. Also, a solution of a polymer within the oil phase can increase the viscosity of that oil phase undesirably and make it unemulsifiable. For this reason, insoluble crosslinked polymers which are suspended in the oil phase may be preferred. Particular nonlimiting examples of such polymers include polyvinyl chloride, polyvinylidene chloride, brominated polystyrene, polyvinyl bromide, polyvinylidene bromide, poly vinyl-diphenyl phosphate, the polymer of a quaternary ammonium salt such as diethyl polyethyleneimine having a counterion such as hexachloroantimonate or phosphate or borate, and the like. Other examples are cited in U.S. Pat. No. 4,164,522 (Gibbs) issued Aug. 18, 1979 and U.S. Pat. No. 4,186,156 (Gibbs) issued Jan. 29, 1980, both of which are incorporated herein by reference.

iii). Non-Polymeric Flame Retardant Additives

Non-polymeric materials conferring flame retardancy comprise the largest commercially available class of general flame retardant additives. Typical examples are described in brochures available from companies such as Albright & Wilson of Richmond, Va., Dover Chemical of Dover, Ohio, Albemarle Chemical of Baton Rouge, La., Laurel Chemical of Cleveland, Ohio, and Akzo Nobel of Dobbs Ferry, N.Y. The commercially available types include a wide range of brominated and chlorinated aliphatic compounds such as ChloroWax™, decabromodiphenyl oxide, tetradecabromo-diphenoxy benzene, tetrabromocyclooctane, dibromoethyldibromocyclohexane, ethylene-bis (tetrabromophthalimide), dibromoneopentylglycol, brominated polystyrene, and hexabromocyclododecane, phosphate and phosphonate esters such as tris[1,3-dichloropropyl] phosphate and bis(2-chloroethyl) 2-chloroethyl phosphonate, and borate esters. These materials conferring flame retardancy can be combined with the foam of the present inventions by any procedure found to be convenient. They can be included in the oil or aqueous phase as unreactive coingredients, applied to the formed emulsion, applied after polymerization, for example, during any washing process, by spraying onto the foam, bathing into the foam, misting onto the foam, or depositing in the form of a condensing vapor. The combination of any of the addition methods may also be useful.

iv) Inorganic Salts

This class comprises substantially inorganic ionic species which contain one or more of the elements Cl, Br, P, B, or Sb. Such materials can be utilized as electrolytes in the aqueous phase prior to emulsification. Another means of use for such materials is to apply them to the foam by a variety of methods including spraying, infusion via bath following by drying, ion exchange with other salts present in the foam, vapor phase deposition, acid neutralization, etc. Particular nonlimiting examples include potassium antimony tartrate, antimony caproate, antimony triethoxide, antimony phosphate, salts containing antimony hexahalide, antimony trisulfide, antimony borate, ammonium phosphate (including polyphoshpates such as pyrophosphate and tri-polyphosphate and hexametaphosphate), ammonium borate, calcium phosphate, calcium chloride, calcium bromide, calcium borate, calcium tetrachlorophthalate, sodium ethyl phosphinate, sodium borate, and other combinations of these or related anions with suitable cations of any type. (For example, one can generally substitute magnesium for calcium in the above cited examples.)

One preferred means of applying some of these examples involves ion exchange of calcium chloride (which is a preferred electrolyte present within the aqueous phase of the emulsion and residual to the polymerized foam) with a soluble sodium salt having the desired counterion which is then insoluble with the exchanged calcium counterion. For example, one may wash the foam containing residual calcium chloride with the water soluble sodium borate or sodium phosphate producing an insoluble calcium salt which is substantive to the foam during aqueous washing.

v. Chemical Modification of the HIPE Foam.

This process involves chemical modification of a HIPE foam to confer a flame retardancy. This process is general to all HIPE foams but is found most practicable for HIPE foams made using dienes which undergo 1,4-polymerization, thus leaving residual double bonds in the foam after polymerization. Exemplary dienes include butadiene, isoprene, piperylene, chloroprene, dichloroprene, 1,3,7-octatriene, bromoprene, dibromoprene, and related compounds such as are disclosed in U. S. Pat. No. 5,767,168 (Dyer et al.) issued Jun. 16, 1998, incorporated herein by reference. These foams may be exposed to halogens such as bromine to brominate the double bonds. Exposure to halogens in water typically forms the halohydrin. Exposure to dichlorocarbene and/or dibromocarbene results in formation of the dichloro- or dibromo- cyclopropyl derivative by addition across the double bond. This can be effected conveniently by combination with a mixture of chloroform, sodium hydroxide, tetra-n-butyl ammonium chloride (or other Phase Transfer Catalyst—PTC), and water which provides dichlorocarbene which adds across the double bond to increase the chlorine content of the foam (see for similar example Ramesan, M. T.; Alex, R. *J Appl. Polym. Sci.* 1998, 68, 153–160, incorporated herein by reference, and Dyer, J. C. Ph.D. Dissertation, The University of North Carolina at Chapel Hill, 1980). Generally, any technique known to those skilled in the art which can modify the foam to increase the content of Cl, Br, B, P, or Sb may be useful. In examples where halogens such as Br and/or Cl are added to the formed foam, it will generally be desirable also to have antimony trioxide present, either by application after the foam is made or inclusion in any pre-emulsification step or by addition to the formed emulsion with mixing followed by curing.

B. Synergist

It has been found that certain agents potentiate the efficacy of certain flame retardant agents present in a polymer. Such materials, called synergists, are often preferred ingredients in the HIPE foams of the present invention. The most preferred example of a synergist is antimony trioxide (empirically denoted as $Sb_2O_6$ in most texts). It has been found preferable to include antimony trioxide as an insoluble component suspended in the oil phase prior to emulsification. The antimony trioxide used is of a very finely ground grade to aid suspension of the particles, such as is available from Laurel Chemicals of Cleveland, Ohio.

These synergists are included in the oil phase typically at levels of between about 0.5% and about 10%, by weight of oil phase, more typically between about 1% and about 5%, most typically at a level of about 3%, when used with other materials conferring flame retardancy of the types generally described supra. It is important to note that these levels described for the synergists are in addition to the level of flame retardant component(s) included in the polymeric foam. The synergist, however applied to the foam, significantly reduces the amount of flame retardant additive needed to confer a given level of retardancy.

C. Limiting Oxygen Index (LOI)

A critical parameter of the foams of the present invention is the LOI. This technique for measuring the flammability of materials is described generally in Horrocks, A. R.; Tune, M.; Price, D. "The Burning Behavior of Textiles and its Assessment by Oxygen-Index Methods", Textile Progress, Vol. 18, Number 1/2/3, The Textile Institute, Manchester, UK, 1989, and in "The Chemistry and Uses of Fire Retardants", cited supra. Typically, in this test, a sample of material is suspended vertically and ignited in an atmosphere enriched in oxygen, e.g., to about 30% partial pressure. The oxygen level in the system is gradually reduced and the point at which extinction occurs is recorded. (The end point can be defined variably by various experimenters. For purposes of the present invention, the method described in ASTM D-2863 is employed.) A high LOI value suggests that the material would burn poorly in field conditions. LOI does not relate to the flammability of a material as a result of application of heat, light, sparks, electrical current, burning cigarette ashes, and the like, nor does it assess the toxicity or amount of gases produced during the heating or fire. However, it is a quantitative, lab measure of flammability which has become widely used as a primary indication of flame retardancy.

For the purposes of the present invention, a HIPE foam is considered to be flame retardant if the LOI value is at least about 18%, preferably at least about 21%, more preferably at least about 23%, and most preferably at least about 25%. Typically the foams will have an LOI value of from about 18% to about 35%, and more typically from about 21% to about 30%. Generally, a material having an LOI greater than about 21% will extinguish unaided after removal of a flame source. The sample may continue to burn if maintained in a very hot environment such as would be encountered in a fire. The material may also smolder for some time even without incandescence. Therefore, a higher LOI value is often required for construction materials, clothing, bedding, furniture, etc. for safety. In some cases, achieving a desirably high LOI value will conflict with achieving other important foam properties (infra), in which case a lower LOI may be preferred so as to provide the best overall compromise.

III. OTHER FOAM CHARACTERISTICS

The polymeric foams of the present invention are relatively open-celled. This means the individual cells of the foam are in complete, unobstructed communication with adjoining cells. The cells in such substantially open-celled foam structures have intercellular openings or "windows" connecting one cell to another within the foam structure.

These substantially open-celled foam structures will generally have a reticulated character with the individual cells being defined by a plurality of mutually connected, three dimensionally branched webs. The strands of polymeric material making up these branched webs can be referred to as "struts." As used herein, a foam material is "open-celled" if at least 80% of the cells in the foam structure that are at least 1 μm in size are in open communication with at least one adjacent cell. This may be determined by inspection of an SEM of the foam.

These polymeric foams may generally be hydrophobic to inhibit the passage of aqueous fluids through the foam, or hydrophilic to encourage inhibition of aqueous fluids into the foam. The hydrophobic/hydrophilic properties of the internal surfaces of the foam structures are controlled by post-polymerization foam treatment procedures. As used herein, the term "hydrophilic" is used to refer to surfaces that are wettable by aqueous fluids deposited thereon. Hydrophilicity and wettability are typically defined in terms of contact angle and the surface tension of the fluids and solid surfaces involved. This is discussed in detail in the American Chemical Society publication entitled *Contact Angle, Wettability and Adhesion*, edited by Robert F. Gould (Copyright 1964), which is incorporated herein by reference.

A surface is said to be wetted by a fluid (i.e., hydrophilic) when either the contact angle between the fluid and the surface is less than 90°, or when the fluid tends to spread spontaneously across the surface, both conditions normally co-existing. Conversely, a surface is considered to be "hydrophobic" if the contact angle is greater than 90° and the fluid does not spread spontaneously across the surface.

The HIPE foams of the present invention are readily optimized so as to confer the properties desired in each specific application. As examples, these foams may be microcellular (<10 μm) up through moderate cell diameters (ca. 150 μm); low density (0.10 g/cc) to very low density (0.004 g/cc); rigid to flexible (corresponding, high Tg to low (subambient) Tg); and strong to weak. The foams may be provided as continuous sheets, rigid thick boards, particulates of various sizes, specific shapes, etc., as required for their end use. However optimized, these foams exhibit an important level of flame retardancy not achieved in previous HIPE foams in the art. These foams also require no chlorofluoro carbon ("CFC") or volatile organic compound ("VOC") materials during manufacture, are generally photostable, are producible readily in large quantities with reasonable economics as either slabstock, roll stock, particulate foam, and the like.

A. Glass Transition Temperature

Typically, an important parameter of the foams of the present invention is the glass transition temperature (Tg). The Tg represents the midpoint of the transition between the glassy and rubbery states of the polymer. Foams that have a Tg higher than the temperature of use can be very strong but can also be very rigid and potentially prone to fracture. Such foams also typically take a long time to recover to the expanded state after having been stored in the compressed state for prolonged periods. Though the end use of a particular foam is an important factor when determining the desired Tg of the foam, preferred are foams having a Tg of from about −40° to about 90° C., more preferably from about 0° to about 70° C., most preferably from about 10° to about 50° C. The method for determining Tg by Dynamic Mechanical Analysis (DMA) is described in the TEST METHODS section of U.S. Pat. No. 5,753,359 (Dyer et al.), issued May 19, 1998, incorporated by reference herein, and below.

B. Foam Density

Another potentially important property of the foams of the present invention is their density. "Foam density" (i.e., in grams of foam per cubic centimeter of foam volume in air) is specified herein on a dry basis, unless otherwise indicated. Any suitable gravimetric procedure that will provide a determination of mass of solid foam material per unit volume of foam structure can be used to measure foam density. For example, an ASTM gravimetric procedure described more fully in the TEST METHODS section of U.S. Pat. No. 5,387,207 (Dyer et al.), issued Feb. 7, 1995 (incorporated by reference herein) is one method that can be employed for density determination. While foams can be made with virtually any density ranging from below that of air to just less than the bulk density of the polymer from which it is made, the foams of the present invention are most useful when they have a dry density in the expanded state of less than about 250 mg/cc, generally between about 80 and about 12 mg/cc, and more generally between about 50 and 20 mg/cc. The exact preference is dependent on the nature of the application under consideration and may vary within these ranges.

C. Cell Size

Foam cells, and especially cells that are formed by polymerizing a monomer-containing oil phase that surrounds relatively monomer-free water-phase droplets, will frequently be substantially spherical in shape. The size or "diameter" of such spherical cells is a commonly used parameter for characterizing foams in general. Since cells in a given sample of polymeric foam will not necessarily be of approximately the same size, an average cell size, i.e., average cell diameter, will often be specified.

A number of techniques are available for determining the average cell size of foams. The most useful technique, however, for determining cell size in foams involves a simple measurement based on the scanning electron photomicrograph of a foam sample. (See FIG. 1)

The cell size measurements given herein are based on the number average cell size of the foam, e.g., as shown in FIG. 1. The foams of the present invention will generally have a number average cell size of not more than about 150 $\mu$m, more generally from about 10 to 100 $\mu$m, and most generally from about 15 $\mu$m to 35 $\mu$m. As with other foam characteristics, the average cell size for a given foam will be dictated in part by its anticipated end use. For example, in applications associated with thermal insulation, relative smaller cells are desired so as to reduce the importance of radiative transmission of thermal energy within the system. In applications associated with filtration, the cell size will vary according to the requirement of the filter.

D. Yield Stress

Yield stress is determined in a stress-strain experiment conducted on the foam at a specified temperature and rate of strain (in compression mode). The yield stress is the stress at the transition from the linear elastic region to the plateau region of the stress-strain curve. Yield stress is indicative of the general strength properties of the polymeric foam at the temperature of interest. For many applications, higher yield stress values are desirable at a given foam density and Tg. The foams of the present invention will preferably have a yield stress value of at least about 0.25 psi, preferably at least about 0.50 psi.

IV. FOAM USES

The polymeric foams of the present invention will have numerous end uses. For example, the foams may be prepared as absorbent materials, particularly for aqueous fluids such as urine and menses. Such foams will be prepared to have the structural characteristics similar to the HIPE foams described in, e.g., U.S. Pat. No. 5,650,222 (DesMarais et al.) issued Jul. 22, 1997; copending U.S. patent application Ser. No. 08/542,497 (Dyer et al., filed Oct. 13, 1995); U.S. Pat. No. 5,387,207 (Dyer et al.), issued Feb. 7, 1995; U.S. Pat. No. 5,550,167 (DesMarais) issued Aug. 27, 1996; and U.S. Pat. No. 5,563,179 (DesMarais et al.), issued Oct. 8, 1996, each of which is incorporated by reference herein. Such absorbent foams may be included in absorbent articles such as infant diapers, feminine hygiene articles (e.g., tampons, catamenial pads), adult incontinence articles, and the like, such as those described in the aforementioned copending patent applications and issued patents.

The flame retardant aspect of the foams of the current invention allow their use in broader areas than if this feature were lacking. For example, these foams may be used in furniture and bedding (mattresses, inner springs, pillows) as part of the resilient portion of each. The foams may be used in seat cushions in automobiles, trains, plains, boats, etc. The foams may also be prepared so as to be useful as insulators. Such foams will have structural characteristics (e.g., cell size, density, Tg) similar to the foams described in U.S. Pat. No. 5,633,291 (Dyer et al.) issued May 27, 1997 and U.S. Pat. No. 5,770,634 (Dyer et al.) issued Jun. 23, 1998, both of which are incorporated by reference herein. Flame retardancy is required to meet certain building codes for insulating materials as well as in furniture and clothing. The foams (treated to be hydrophilic) may also be used as absorbent drapes in surgical theaters where flame retardanc, is important. The foams may be used as a filter or a component of a composite filter for air or oils wherein flame retardancy may be an asset. Other general uses of flame retardant HIPE foams include use in loud speaker enclosures to dampen unwanted acoustic frequencies, in submarine hulls to absorb acoustic energy, in bedding mattresses, mattress covers, pillows, blankets, and the like, in protective apparel such as is worn by fire fighters as thermal insulation, in gloves to protect against heat or cold, in insulating vessels such as coolers, in automobiles, trains, and planes as acoustic and thermal insulators and in cushions in such conveyances, in pouches for protecting food, in shipping containers to protect sensitive articles against mechanical shock, in gas and fuel tanks and pipelines, as filters for air or especially flammable liquids, in ceiling tiles, carriers for inks, dyes, lubricants, lotions, and for making items buoyant.

V. PREPARATION OF FLAME RETARDANT POLYMERIC FOAMS

A. In General

Polymeric foams of the present invention are prepared by polymerization of HIPEs. The relative amounts of the water and oil phases used to form the HIPEs determine the density of the resulting foam. Density is, among many other parameters, critical to the mechanical and performance properties of the resulting polymeric foams. The ratio of water to oil in the emulsion can also influence the cell size and dimensions of the struts that form the foam. The emulsions used to prepare the HIPE foams will generally have a volume to weight ratio of water phase to oil phase of at least about 3:1, preferably of at least about 12:1. Typically the volume to weight ratio will be from about 12:1 to about 85:1, more typically from about 20:1 to about 50:1.

The process for obtaining these polymeric foams, which have an LOI value of at least about 21%, comprises the steps of:

(A) forming a water-in-oil emulsion from:
  (1) an oil phase comprising:
    (a) from about 80% to about 98%, by weight of the oil phase, of a monomer component comprising:
      (i) from about 0% to about 90%, by weight of the monomer component, of a substantially water-insoluble, monofunctional monomer capable of forming a homopolymer having a Tg of about 40° C. or less;
      (ii) from about 0% to about 70%, by weight of the monomer component, by weight of a substantially water-insoluble, monofunctional comonomer capable of imparting toughness about equivalent to that provided by styrene;
      (iii) from about 5% to about 50%, by weight of the monomer component, of a first substantially water-insoluble, polyfunctional crosslinking agent selected from the group consisting of divinyl benzene and analogs thereof; and (iv) from about 0% to about 20%, by weight of the monomer component, of a second substantially water-insoluble, polyfunctional crosslinking agent selected from the group consisting of diacrylates and dimethacrylates of diols and analogs thereof, and (b) from about 2% to about 20%, by weight of the oil phase, of an emulsifier component which is soluble in the oil phase and which is suitable for forming a stable water-in-oil emulsion;

(2) an aqueous phase comprising from about 0.1% to about 20%, by weight of the aqueous phase, of a water-soluble electrolyte;

(3) a volume to weight ratio of aqueous phase to oil phase of at least about 3:1; and (4) wherein the emulsion comprises one or more components which confer flame retardancy to the polymeric foam, wherein the one or more components are included at a level of at least about 5%, by total weight of the oil phase; and (B) polymerizing the monomer component in the oil phase of the water-in-oil emulsion to form the polymeric foam.

The term "monofunctional", as used herein, refers to one polymerizable moiety. The term "polyfunctional", as used herein, refers to more than one polymerizable moiety.

The polymeric foam material can be subsequently iteratively washed and dewatered to provide a dry, hydrophobic foam. Alternatively, the foam may be rendered hydrophilic by appropriate surface treatment with any of a number of hydrophilizing agents, including calcium chloride and similar salts, residual emulsifiers used for stabilizing the HIPE, and other wetting agents well known to those skilled in the art. Hydrophilizing treatments are described in, e.g., U.S. Pat. No. 5,387,207 (Dyer et al.), issued Feb. 7, 1995 (see especially column 22 to column 24), which is incorporated herein by reference. As the presence of certain salts can themselves confer a degree of flame retardancy, it can be desirable to leave them present on the foam. A nonlimiting list of examples includes ammonium phosphate, calcium phosphate, calcium hexachloroantimonate, calcium hexabromoantimonate, calcium tetrafluoroborate, calcium chloride, calcium ammonium phosphate, calcium borate, and other Group IA and Group IIA analogs of these salts. Residual calcium chloride is often associated with hydrophilicity and metal corrosion which may not be preferred in all cases. However, the retained water of hydration of this salt contributes to flame retardancy. In practice, these salts may be applied in any washing step intended to remove the salt used in the emulsion. Such a washing step may comprise simple ion exchange to convert the soluble calcium chloride used in the emulsification to another calcium salt by treatment with the soluble sodium salt as part of the aqueous washing solution. If this step is followed by thermal drying (infra), the applied salt may migrate with the evaporating aqueous wash fluid to the surface of the foam and concentrate there beneficially with respect to surface flame retardancy. While these steps are ameliorative with respect to flame retardancy, they have not been found sufficient in themselves to confer the desired high LOI values characteristic to the foams of the present invention.

These foams may be shaped as desired. Typically, this shaping will comprise slicing into sheets. These sheets may optionally be compressed, e.g. continuously through pressure nips, into a thin state and wound into rolls. Compressible sheets can retain their relatively thin compressed state until unwound, applied as desired, and either heated above their activation temperature (usually about the Tg of the polymer) or allowed to stand for a relatively long period of time, e.g. several weeks or months, depending on the ambient temperature, as described in U.S. Pat. No. 5,770,634 (Dyer et al.) issued Jun. 23, 1998, incorporated herein by reference. Alternatively, the shapes may be conferred by the shape of the vessel in which the HIPE is cured so as to form the polymeric foam material. Such foams are defined as "compressible" when the foam is compressed to 33% of its original expanded thickness and is thereafter maintained without artificial restraint on its surface, the foam will reexpand by no more than 50% after 21 days at 22° C. The method for measuring compressibility is described in U.S. Pat. No. 5,770,634, incorporated herein by reference. Alternatively, the cured foam may be sliced, diced, shredded, ground, or otherwise comminuted into small particulate pieces for further use.

1. Oil Phase Components

The continuous oil phase of the HIPE comprises comonomers that are polymerized to form the solid foam structure. This monomer component is preferably formulated to be capable of forming a copolymer having a Tg of from about −40° to about 90° C., and generally from about 0° to about 70° C., more generally from about 10° to about 50° C. This monomer component preferably includes at least one component conferring flame retardancy to the foam structure. Such components are described in detail above under the headings Copolymerizable Monomers, Noncovalently Blended Polymers, Non-polymeric Flame Retardant Additives and Inorganic Salts. Such components are present collectively at a level of at least about 5% (e.g., two components could each be present at levels of 3% each but collectively giving 6% by weight of the oil phase). Since various flame retardant ingredients may not be equally effective at a given level, the level used will depend on the specific material conferring flame retardancy employed, but will generally be from about 8% to about 90%, and more generally from about 25% to about 80%. Levels of such components lower than about 5% are found to be minimally effective. Also, such components at levels above about 20% may alter the thermomechanical properties of the polymer significantly. This may require reformulation of the other monomers so as to compensate. For this reason, as well as in consideration of the expense of some flame retardant additives, it is desired to manage the level of the material conferring retardancy to be as low as will confer the degree of retardancy needed for the specific application.

The monomer component of the oil phase may typically comprise Tg lowering monofunctional monomers, monomers which impart toughness, at least one polyfunctional crosslinking agent, at least one emulsifier. It is important to note that any or all of these monomer components may be selected or be modified so as to contain one or more of the elements which confer retardancy to the resulting foam. In addition the oil phase may contain additional optional components. Optional oil phase components include synergists (described above), antioxidants, plasticizers, filler particles, colorants (dyes or pigments), fluorescent agents, chelants, opacifying agents, and chain transfer agents. The monomer components are described in detail below.

The selection of particular types and amounts of monofunctional monomer(s) and comonomer(s) and polyfunctional cross-linking agent(s) can be important to the realization of HIPE foams having the desired combination of structure, and mechanical properties which render such materials suitable for use in the invention herein.

It should be understood that when the material conferring flame retardancy serves also as a Tg lowering monomer, a toughening monomer, a crosslinking monomer, and/or an emulsifier, its level will exceed 5% by weight of oil phase as stated above and no other flame retardant additive would be necessary to comply with the ranges stated above for that component. For example, a HIPE foam comprising, for example, 10 % chloroprene and 90% DVB would exceed the 5% requirement for a flame retardant ingredient containing one or more of the specified elements (Cl, Br, P, B, Sb) and would need no other adjuvant to comply with the ranges described.

a. Tg Lowering Monofunctional Monomers

One component of the oil phase comprises at least one monofunctional comonomer whose atactic amorphous homopolymer has a Tg of about 40° C. or lower (see Brandup, J.; Immergut, E. H. "Polymer Handbook", 2nd Ed., Wiley-Interscience, New York, N.Y., 1975, III-139.), described hereinafter as a "Tg lowering monomer". These monomers tend to impart rubber-like properties to the resulting polymeric foam structure. It is preferred that alkyl methacrylate, alkyl acrylate, alkyl methacrylarnide, alkyl acrylamide, and monomers of this general type be avoided. These monomers are found to produce foams which are more difficult to render flame retardant, e.g., they require higher levels of the flame retardant ingredient than foams where these monomers are absent (or present at very low levels). Without being bound by theory, it is believed that these monomers are readily displaced from the polymer chain by depolymerization when the polymer is heated in air. This facet may not reduce the LOI values of the foam intrinsically. In that test, the foam is lit with open flame and not heated gradually. However, in other situations, the foam may be heated prior to burning, resulting in depolymerization. This can enrich the atmosphere above the foam with flammable monomer which contributes to flanmmability. Since the prior art has depended largely on alkyl acrylates for this Tg lowering function, this preferred restriction imposes a significant constraint on the ability to produce lower Tg foams having flame retardancy. As discussed above, LOI is but one indication of the flame retardant properties of a material and it is desirable to reduce the flammability of the HIIPE foams under all environments which could result in a fire.

Applicants have found that certain halogen-substituted butadienes are particularly effective in conferring both flame retardancy and Tg lowering features. Nonlimiting examples include 2-chloro-1,3-butadiene (chloroprene) and 2,3-dichloro-1,3-butadiene (dichloroprene) and the bromine analogs (bromoprene and dibromoprene), 2-chloropiperylene, and combinations of such monomers. Other candidates include vinyl chloride, vinyl bromide, vinylidene chloride, and vinylidene bromide, though these monomers are comparatively toxic and volatile which imposes process constraints. Of these monomers, chloroprene, dichloroprene, bromoprene, dibromoprene are the most preferred. In such cases, these monomers serve as both the Tg lowering component and the flame retardant component, so no other material conferring flame retardancy may be required. As such monomers serve a dual purpose, this has been found to be a particularly efficient approach to achieving the desired result.

Other Tg lowering monomers suitable for use herein are disclosed in U.S. Pat. No. 5,770,634 issued Jun. 23, 1998, especially including $C_4$–$C_{12}$ alkyl styrenes such as p-n-octylstyrene, isoprene, butadiene, 1,3,7-octatriene, and piperylene. These monofunctional monomer(s) will generally comprise 0 to about 70%, more preferably from about 20 to about 60%, by weight of the monomer component.

b. Comonomers Imparting Toughness.

The monomer component utilized in the oil phase of the HIPEs may also comprise one or more monofunctional comonomers capable of imparting toughness about equivalent to that provided by styrene to the resulting polymeric foam structure. Tougher foams exhibit the ability to deform substantially without failure. These monofunctional comonomer types can include styrene-based comonomers (e.g., styrene and ethyl styrene) or other monomer types such as methyl methacrylate where the related homopolymer is well known as exemplifying toughness. The preferred monofunctional comonomers of this type are styrene-based monomers including styrene and ethyl styrene. The monofunctional "toughening" comonomer will normally comprise from about 0 to about 70%, preferably from about 20% to about 50%, most preferably from about 30% to about 50%, by weight of the monomer component.

In certain cases, the "toughening" comonomer can also impart the desired rubber-like properties to the resultant polymer. For such comonomers, the amount that can be included in the monomer component will be that of the typical monomer and comonomer combined. An example is 4-octylstyrene. Similarly, in certain cases the "toughening" comonomer can also impart desired flame retardancy to the resultant polymer. Particularly preferred examples include isomers of chlorinated and/or brorninated styrene, e.g., 4-chlorostyrene. When these monomers are employed, no other flame retardant additive may be required to fulfill the conditions of the present invention.

c. Polyfunctional Crosslinking Agent

The monomer component contains at least one polyfunctional crosslinking agent. As with the monofunctional monomers and comonomers, selection of the particular type and amount of crosslinking agent(s) is important to the realization of polymeric foams having the desired combination of structural and mechanical properties.

The polyfunctional crosslinking agent can be selected from a wide variety of monomers containing two or more activated vinyl groups, such as divinylbenzenes and analogs thereof. Analogs of divinylbenzenes useful herein include, but are not limited to, trivinyl benzenes, divinyltoluenes, divinylxylenes, divinylnaphthalenes divinylalkylbenzenes, divinylphenanthrenes, divinylbiphenyls, divinyldiphenylmethanes, divinylbenzyls, divinylphenylethers, divinyldiphenylsulfides, divinylfurans, divinylsulfide, divinylsulfone, and mixtures thereof. Divinylbenzene is typically available as a mixture with ethyl styrene in proportions of about 55:45. These proportions can be modified so as to erich the oil phase with one or the other component. Generally, it is advantageous to enrich the mixture with the ethyl styrene component while simultaneously reducing the amount of styrene in the monomer blend. The cross-linking agent can generally be included in the oil phase of the HIPE in an amount of from about 2 to about 50%, more preferably from about 10 to about 35%, most preferably from about 15% to about 25%, by weight of the monomer component (on a 100% basis).

The crosslinking agent can also be selected from polyfunctional acrylates or methacrylates such as those disclosed in in U.S. Pat. No. 5,770,634 issued Jun. 23, 1998, incorporated herein by reference. Inclusion of these typically makes conference of flame retardancy to the resulting foam more challenging or requiring higher levels of materials conferring flame retardancy to be effective. This second cross-linking agent can generally be included in the oil phase of the HIPE in an amount of from 0 to about 15% by weight of the monomer component.

In certain cases the crosslinking agent can also impart desired flame retardancy to the resultant polymer. Particularly preferred examples include chlorinated and/or brominated DVB such as 4chloro-2,5-divinylbenzene and halogenated di- and tri- and tetra- acrylates such as 2,3-dibromobutan-1,4-diol diacrylate.

d. Emulsifiers

Another essential component of the oil phase of the HIPE is an emulsifier component. Suitable emulsifiers are well known to those skilled in the art. Particularly preferred emulsifiers include Span 20™, Span 40™, Span 60™, and Span 80™. These are nominally esters of sorbitan derived from lauric, myristic, stearic, and oleic acids, respectively. Other preferred emulsifiers include the diglycerol esters derived from monooleate, monomyristate, monopalmitate, and monoisostearate acids. A preferred coemulsifier is ditallowdimethyl ammonium methyl sulfate. Other preferred emulsifiers and coemulsifiers are described in U.S. Pat. No. 5,650,222 (DesMarais et al.) issued Jul. 22, 1997, incorporated herein by reference. Mixtures of these emulsifiers are also particularly useful, as are purified versions of each, specifically sorbitan esters containing minimal levels of isosorbide and polyol impurities.

In certain cases, the emulsifier can also impart desired flame retardancy to the resultant polymer, as when the emulsifier contains one or more of the elements Cl, Br, P, B, and/or Sb. This can be achieved, for example, by brominating the double bonds of unsaturated emulsifiers, such as those containing oleate groups.

An optional secondary emulsifier(s) may be included in the emulsifier component, typically at a weight ratio of primary to secondary emulsifier of from about 50:1 to about 1:4, preferably from about 30:1 to about 2:1. As is indicated, those skilled in the art will recognize that any suitable emulsifier(s) can be used in the processes for making the foams of the present invention.

The oil phase used to form the HIPEs comprises from about 80 to about 98% by weight monomer component and from about 2 to about 20% by weight emulsifier component. Preferably, the oil phase will comprise from about 90 to about 97% by weight monomer component and from about 3 to about 10% by weight emulsifier component. The oil phase also can contain other optional components. One such optional component is an oil soluble polymerization initiator of the general type well known to those skilled in the art, such as described in U.S. Pat. No. 5,290,820 (Bass et al), issued Mar. 1, 1994, which is incorporated by reference and WO 97/44368 (Willkomm and Hinze) filed May 23, 1996, which is incorporated herein by reference.

e. Optional Components

The oil phase may contain optional components. Such optional components include antioxidants which can be essential in preventing premature aging of foams, particularly those based on butadiene-based monomers (supra). Applicants have determined that foams based on Tg lowering monomers such as chloroprene tend to age (discolor and/or rigidity) when exposed to air and light. Of particular importance, such aging appears also to contribute to the flammability of such HIPE foams. Thus, the stabilization of such foams with respect to exposure to oxygen and light can be critical in maintaining the desired level of flame retardancy.

In such cases, inclusion of a small amount of an antioxidant, particularly of the type classified as a Hindered Amine Light Stabilizer (HALS), or a Hindered Phenolic Stabilizer (HPS) is preferred. Such antioxidants may be applied during any convenient step in the processing. Many of the HALS types may be included in the oil phase without interfering with the emulsification or polymerization significantly. The HPS types generally must be added post-polymerization as they are destroyed by the free radical initiator in most cases.

Nonlimiting examples of HALS include bis-(1,2,2,5,5-pentamethylpiperidinyl) sebacate (Tinuvin™765), Tinuvin™123, Tinuvin™770, Tinuvin™622, Chimassorb™119 and Chimassorb™944FL, products of Ciba Specialty Chemicals of Tarrytown, N.Y.

Nonlimiting examples of HPS include Irganox™-1076, Irganox™-129, Irganox™-1035, Irganox™-1425 WL, Irganox™-MD 1024, Irganox™-1076, Irgafos™-12, IrgafoS™-168, IrgafoS™-38, and t-butylhydroxyquinone, products of Ciba Specialty Chemicals of Tarrytown, N.Y.

Also useful in conferring light stability are UV absorbent compounds, including the general class of 2-hydroxybenzophenones and hydroxyphenyl benzotriazoles. These UV stabilizers are available commercially under tradenames such as Tinuvin™234, Tinuvin™P, Tinuvin™328, Tinuvin™327, and related compounds, products of Ciba Specialty Chemicals of Tarrytown, N.Y. Reactive UV absorbers may also be used as part of the oil phase. An example is 4-methacryloxy-2-hydroxybenzophenone.

Another optional component is a plasticizer such as dioctyl azelate, dioctyl sebacate or dioctyl adipate. In specific examples, these plasticizers may also contain one or more of the elements Cl, Br, P, B, and/or Sb, thus comprising the material conferring flame retardancy as well as plasticizing agent. Cited as a general example of this type are the chlorinated alkyl esters of phosphoric acid.

Yet another of the optional ingredients are filler particles which may toughen the polymer and/or increase its thermal insulating properties. Example filler particules include aluminum, titanium dioxide, carbon black (added as very fine, insoluble particles), graphite, calcium carbonate, talc, insoluble, crosslinked flame retardant polymers, and the like. Other optional components include colorants (dyes or pigments), perfumes, chelants such as Zeolites, fluorescent agents, opacifying agents, chain transfer agents, and the like. Such additives are typically added at fairly low levels when present (e.g., less than 5%) and need not be soluble in the oil phase but may be suspended by agitation therein.

2. Water Phase Components

The discontinuous water internal phase of the HIPE is generally an aqueous solution containing one or more dissolved components. One essential dissolved component of the water phase is a water-soluble electrolyte. The dissolved electrolyte minimizes the tendency of monomers, comonomers, and crosslinkers that are primarily oil soluble to also dissolve in the water phase. This, in turn, is believed to minimize the extent to which polymeric material fills the cell windows at the oil/water interfaces formed by the water phase droplets during polymerization. Thus, the presence of electrolyte and the resulting ionic strength of the water phase is believed to determine whether and to what degree the resulting preferred polymeric foams can be open-celled.

Any electrolyte capable of imparting ionic strength to the water phase can be used. Preferred electrolytes are mono-, di-, or trivalent inorganic salts such as the water-soluble halides, e.g., chlorides, nitrates and sulfates of alkali metals and alkaline earth metals. Examples include sodium chloride, calcium chloride, sodium sulfate and magnesium sulfate. Calcium chloride is the most preferred for use in preparing the HIPEs Generally the electrolyte will be utilized in the water phase of the HIPEs in a concentration in the range of from about 0.2 to about 20% by weight of the water phase. More preferably, the electrolyte will comprise from about 1 to about 10% by weight of the water phase.

As discussed above, the electrolyte in the aqueous phase can also impart desired flame retardancy to the resultant polymer when left as part of the final material.

The HIPEs will also typically contain an effective amount of a polymerization initiator. Such an initiator component is generally added to the water phase of the HIPEs and can be any conventional water-soluble free radical initiator. These include peroxygen compounds such as sodium, potassium and ammonium persulfates, hydrogen peroxide, sodium peracetate, sodium percarbonate and the like. Conventional redox initiator systems can also be used. Such systems are formed by combining the foregoing peroxygen compounds with reducing agents such as sodium bisulfite, L-ascorbic acid or ferrous salts. The initiator can be present at up to about 20 mole percent based on the total moles of polymerizable monomers present in the oil phase. More preferably, the initiator is present in an amount of from about 0.001 to about 10 mole percent based on the total moles of polymerizable monomers in the oil phase.

3. Hydrophilizing Surfactants and Hydratable Salts

The polymer forming the HIPE foam structure will preferably be substantially free of polar functional groups. This means the polymeric foam will be relatively hydrophobic in character. When these foams are to be used as insulating materials, resistance to water is generally a desired feature. Removal of the residual emulsifier and/or salt following polymerization can be effected as needed by any means including those described in U.S. Pat. No. 5,633,291 (supra). Alternatively, the foam may be washed with an aqueous solution of sodium bicarbonate, which converts residual calcium chloride to the insoluble calcium bicarbonate, which generally greatly reduces the water affinity of the foam.

B. Processing Conditions for Obtaining HIPE Foams

Foam preparation typically involves the steps of: 1) forming a stable high internal phase emulsion (HIPE); 2) polymerizing/curing this stable emulsion under conditions suitable for forming a solid polymeric foam structure; 3) optionally washing the solid polymeric foam structure to remove the original residual water phase, emulsifier, and salts from the polymeric foam structure; 4) thereafter dewatering this polymeric foam structure; and 5) optionally hydrophilizing the foam. As discussed herein, the material conferring flame retardancy can be introduced at various stages of the making process.

1. Formation of HIPE

The HIPE is formed by combining the oil and water phase components in the previously specified ratios. The oil phase will typically contain the requisite monomers, comonomers, crosslinkers, and emulsifiers, as well as optional components such as plasticizers, antioxidants, materials conferring flame retardancy, and chain transfer agents. The water phase will typically contain electrolytes and polymerization initiators.

The HIPE can be formed from the combined oil and water phases by subjecting these combined phases to shear agitation. Shear agitation is generally applied to the extent and for a time period necessary to form a stable emulsion. Such a process can be conducted in either batchwise or continuous fashion and is generally carried out under conditions suitable for forming an emulsion where the water phase droplets are dispersed to such an extent that the resulting polymeric foam will have the requisite structural characteristics. Emulsification of the oil and water phase combination will frequently involve the use of a mixing or agitation device such as a pin impeller.

One preferred method of forming HIPE involves a continuous process that combines and emulsifies the requisite oil and water phases. In such a process, a liquid stream comprising the oil phase is formed. Concurrently, a separate liquid stream comprising the water phase is also formed. The two separate streams are then combined in a suitable mixing chamber or zone such that the requisite water to oil phase weight ratios previously specified are achieved.

In the mixing chamber or zone, the combined streams are generally subjected to shear agitation provided, for example, by a pin impeller of suitable configuration and dimensions. Shear will typically be applied to the combined oil/water phase stream at an appropriate rate. Once formed, the stable liquid HIPE can then be withdrawn from the mixing chamber or zone. This preferred method for forming HIPEs via a continuous process is described in greater detail in U.S. Pat. No. 5,149,720 (DesMarais et al.), issued Sep. 22, 1992, which is incorporated by reference, and U.S. Pat. No. 5,650,222 (DesMarais et al.) (supra). See also copending U.S. application Ser. No. 08/716,510 filed Sep. 17, 1996 by T. DesMarais (incorporated herein by reference), which describes an improved continuous process having a recirculation loop for the HIPE.

2. Polymerization/Curing of the HIPE

The HIPE formed will generally be formed, collected, or poured in a suitable reaction vessel, container or region to be polymerized or cured. In one embodiment, the reaction vessel is constructed of polyethylene from which the eventually polymerized/cured solid foam material can be easily removed for further processing after polymerization/curing has been carried out to the extent desired. The temperature at which the HIPE is poured into the vessel is generally about the same as the polymerization/curing temperature.

Suitable polymerization/curing conditions will vary depending upon the monomer and other makeup of the oil and water phases of the emulsion (especially the emulsifier systems used), and the type and amounts of polymerization initiators used. Frequently, however, suitable polymerization/curing conditions will involve maintaining the HIPE at elevated temperatures above about 30° C., more preferably above about 35° C., for a time period ranging from about 2 to about 64 hours, more preferably from about 4 to about 48 hours. The HIPE can also be cured in stages such as described in U.S. Pat. No. 5,189,070 (Brownscombe et al.), issued Feb. 23, 1993, which is herein incorporated by reference.

A porous water-filled open-celled HIPE foam is typically obtained after polymerization/curing in a reaction vessel, such as a cup or tub. This polymerized HIPE foam is typically cut or sliced into a sheet-like form. Sheets of polymerized HIPE foam are easier to process during subsequent treating/washing and dewatering steps, as well as to prepare the HIPE foam for use in insulation materials. The polymerized HIPE foam is typically cut/sliced to provide a cut thickness in the range of from about 0.08 in. to about 3.5 in.

3. Treating/Washing HIPE Foam

The polymerized HIPE foam formed will generally be filled with residual water phase material used to prepare the HIPE. This residual water phase material (generally an aqueous solution of electrolyte, residual emulsifier, and polymerization initiator) may be removed prior to further processing and use of the foam. Removal of this original water phase material will usually be carried out by compressing the foam structure to squeeze out residual liquid and/or by washing the foam structure with water or other aqueous washing solutions. Frequently, several compressing and washing steps, e.g., from 2 to 4 cycles, will be desirable. It is preferable that the water used in these washing be heated to at least about the Tg of the polymer so as to maintain its flexibility and compliance during compressive dewatering and to reduce and prevent damage to the foam structure.

4. Foam Dewatering

After the HIPE foam has been treated/washed, it will be dewatered. Dewatering can be achieved by compressing the foam to squeeze out residual water, by subjecting the foam or the water therein to temperatures of from about 60° to about 200° C. or to microwave treatment, by vacuum dewatering or by a combination of compression and thermal drying/microwave/vacuum dewatering techniques. These HIPE foams are typically compressively dewatered to a thickness of about ⅓ (33%) or less of their fully expanded thickness. The dewatering step will generally be carried out until the HIPE foam is ready for use and is as dry as practicable. Frequently such compression dewatered foams will have a water (moisture) content of from about 1% to about 15%, more preferably from about 5% to about 10%, by weight on a dry weight basis.

Alternative methods of dewatering may be used where convenient. Typically, removal of water by evaporation is too slow unless the water is heated. Typically, the thermal energy needed to volatilize water at a reasonable rate at this level from a material is found to be energy intensive. For this reason, the preferred upper Tg of the HIPE foam of the present invention is set at about 90° C. to enable compressive dewatering using hot water without destroying the structure of the foam. If higher Tg foams are desired, another method of dewatering would need to be employed.

5. Foam Hydrophilization

When hydrophilic foams are desired, such as for use in absorbent articles, it may be desirable to treat the washed, dewatered foam with a hydrophilizing agent. Suitable hydrophilizings agents and methods for hydophilizing foams are disclosed fully at, e.g., column 22 to column 24 of U.S. Pat. No. 5,387,207, U.S. Pat. No. 5,292,777 (DesMarais) issued Mar. 8, 1994, and U.S. Pat. No. 5,352,711 (DesMarais) issued Oct. 4, 1994, all of which are incorporated herein by reference.

VI. TEST METHODS

A. Flame Retardancy

A simple lab method for screening candidates for flammability is as follows. A sample of foam is cut to approximate dimensions 0.5 cm×0.5 cm×5 cm. The sample is suspended in a clamp with the longest axis protruding forward in a ventilated laboratory hood. The front end of the sample is ignited with a propane torch. Recorded data include time to extinction and % residual ash. The Limited Oxygen Index (LOI) data is performed according ASTM D-2863 on samples made 2.54 cm in thickness and cut into 6"×6" squares. These values are reported as percentages of partial pressure of oxygen needed to support the flame, including significant smoldering of the residue.

B. Thermomechanical Property Measurements

Samples are prepared for evaluation by slicing into 3 to 8 mm thick pieces and stamping out of these pieces cylinders having a diameter of 2.54 cm. These cylinders or "pucks" are washed successively in water (with intermediate squeezing steps) and 2-propanol to remove residual salt and emulsifier. These samples are then dried (either at ambient or elevated temperatures up to 65° C.). In some cases, the samples collapse upon drying and must be freeze-dried to recover a fully-expanded sample for testing.

i. Dynamic Mechanical Analysis (DMA)

DMA is used to determine the Tgs of polymers including polymeric foams. While Tg can be determined by a variety of methods, the data reported herein are obtained using a Rheometrics RSA-11 dynamic mechanical analyzer set in compression mode using parallel plates 25 mm in diameter. Instrument parameters used are cited in U.S. Pat. No. 5,770,634 (infra). The glass transition temperature is taken as the maximum point of the loss tangent ($\tan[\delta]$) versus temperature curve.

ii. Yield Stress

Yield stress can be quantified by compressing a foam sample at a specific rate and at a specific temperature and measuring the resistance exerted by that sample to the compression. Typically, the data are formatted as a plot of stress on the y-axis and strain on the x-axis. Such plots typically show an initial linear response followed by a rapid loss in resistance to further compression at a point termed the "yield point". The yield point is defined as the intersection of the lines formed by the linear regions before and after the yield point. The yield stress is the stress value at that intersection. The analysis is performed using the same equipment defined in the preceding section (Rheometrics RSA-II) operating in a constant strain mode. In this mode, the temperature is set to 3 1° C. and the strain rate is set at 0.1%/second. The sample is held at this temperature for at least 5 minutes prior to the initiation of compression to bring it to the defined temperature. The experiment is run for 10 minutes in compression followed by 10 minutes at the same rate of strain in the reverse direction. The data analysis is conducted as described above.

iii. Density

Density is the weight of a given sample divided by its volume and may be determined by any appropriate standard method. Density measurements used herein involve weighing the cylindrical samples (pucks) used in the above measurements which have a diameter of 2.54 cm. The thickness of the sample is determined by measurement. The density is calculated using the equation density=weight (mg)/(0.507×thickness (mm)) expressed in units of mg/cc. The samples are typically washed in water and 2-propanol to remove salt and residual emulsifier from the sample prior to these measurements. The measured densities conform closely to what is expected from the water-to-oil ratio of the HIPE from which the particular foam is derived, e.g., density=(1/(W:O ratio+1)) in units of g/cc.

iv. Thermogravimetric Analysis (TGA)

TGA is preformed on small samples using TA Instruments 2950 TGA system equipped with an autosampler. The sweep rate is 5° C./minute. The temperature range is typically ambient to 500° C. The maximum on the peaks is recorded. This technique shows the weight loss of the sample as it is heated. The test is run in air and in nitrogen on identical samples in separate experiments.

VII. EXAMPLES

Comparative Example A

A HIPE foam is prepared using the following general procedure.

The standard aqueous phase consists of 4% calcium chloride (anhydrous) and 0.05% potassium persulfate (initiator). The oil phase is prepared according to the monomer ratios described in Table 1. The oil phase also contains the emulsifier(s) for forming the HIPE. The reference emulsifier is diglycerol monooleate (DGMO) used at a level of 4–6% by weight of oil phase, depending on W:O ratio of the HIPE. The DGMO emulsifier (Grindsted Products; Brabrand, Denmark) comprises approximately 81% diglycerol monooleate, 1% other diglycerol monoesters, 3% polyglycerols, and 15% other polyglycerol esters. This imparts a minimum oil phase/water phase interfacial tension value of approximately 2.5 dyne/cm and has a critical aggregation concentration of approximately 2.9 wt %.

To form the HIPE, the oil phase is placed in a 3" diameter plastic cup. The water phase is placed in a jacketed addition funnel held at about 50° C. The contents of the plastic cup are stirred using a Cafrano RZR50 stirrer equipped with a six-bladed stirrer rotating at about 300 rpm (adjustable by operator as needed). The water phase is added to the oil phase in the plastic cup with constant agitation over a period of about 2 to 5 minutes. The cup is moved up and down as needed to stir the HIPE as it forms so as to incorporate all the water phase into the emulsion as homogeneously as possible.

The HIPE in the 3" plastic cups are capped (not tightly) and placed in an oven set at 65° C. overnight to cure and provide a polymeric HIPE foam. The cured WIPE foam is removed from the cup as a cylinder 3" in diameter and about 4" in length. The foam at this point is saturated with residual water phase (containing dissolved emulsifiers, electrolyte, initiator residues, and initiator). The foam is sliced on a meat slicer to give circular pieces about 5 to about 7 mm in thickness. These slices are then washed, squeezed, and dried for analysis. For LOI measurements, several such cups of emulsion are poured into a mold shaped to provide a sample with dimensions of 1"×6"×6" needed for testing.

For mechanical property analysis, the samples are further washed with distilled water and compressed to remove the water 3 to 4 times. They are further washed in 2-propanol and compressed about 3 to 4 times. The pieces are then dried in an oven set at 65° C. for 1 to 2 hours.

TABLE 1

Foam Properties.

| W:O Ratio | EHA % | DVB42 % | HDDA % | Styrene % | Yield Stress (psi) | Density (mg/cc) SW | Tg (° C.) WW | Tg (° C.) SW | LOI |
|---|---|---|---|---|---|---|---|---|---|
| 45:1 | 55% | 33% | 12% | 0% | 1.0 | 21.8 | 20° | 29° | <15.9% |
| 60:1 | 63.2% | 30.8% | 6% | 0% | 0.4 | 16.5 | 11° | 20° | <15.9% |
| 16:1 | 57.5% | 12.5%* | 0% | 30% | 0.5 | 47.6 | 8° | 16° | <15.9% |
| 60:1 | 58% | 42% | 0% | 0% | 0.4 | 16.5 | 2° | 10° | <15.9% |

EHA = 2-ethylhexyl acrylate; available from Aldrich Chemical Corp of Milwaukee, WI.
DVB = divinyl benzene, based on 39–42% purity with 58–61% ethyl styrene impurity; available from Dow Chemical Corp. of Midland, MI. The 12.5%* is technical grade DVB of 55% purity; available from Aldrich Chemical Corp of Milwaukee, WI.
HDDA = 1,6-hexanediol diacrylate; available from Aldrich Chemical Corp of Milwaukee, WI.
Styrene is available from Aldrich Chemical Corp of Milwaukee, WI.
Yield stress is measured on water washed (WW) samples.
Density is measured on SW samples.
Tg is measured on WW and solvent washed (SW) samples.
"LOI" is Limited Oxygen Index of the foam. LOI may be measured using a contract laboratory such as Polymer Diagnostics Labs.

The HIPE foams in Table 1 of Comparative Example A fall outside the current invention as their LOI values are less than about 18% and the foams burn readily in lab testing.

The following are provided as nonlimiting examples of this invention, e.g., HIPE foams with LOI of at least about 18%. In cases where specific LOI values were not available, estimated values based on the lab test described in section VI, Test Methods, paragraph A, Flame Retardancy are provided (indicated as estimates).

Example 1

This example illustrates the use of flame retardant (FR) monomers which are copolymerized into the main chain on the polymer network. The process from the comparative example is followed with different oil phases as are given in Table 2, infra. In examples where chloroprene is present, the aqueous phase used to form the emulsion is not heated and the initial curing temperature is 45° C. for 18 hours increasing to 65° C. for 18 hours to achieve final cure. Alternatively, such emulsions are cured at 65° C. in a pressure vessel charged to at least about 2 atmospheres of pressure (from an argon tank). The antimony trioxide is suspended in the oil phase where present.

TABLE 2

Foam Properties (W:O Ratio 40:1).

| FR Type | FR Monomer % | $Sb_2O_6$ % | DVB42 % | Styrene % | Density (mg/cc) SW | LOI |
|---|---|---|---|---|---|---|
| A | 77% | 3% | 20% | 0% | 25 | 26.9% |
| B | 77% | 3% | 20% | 0% | 25 | 26% est. |
| C | 20% | 0% | 20% | 60% | 25 | 18.1% |
| D | 85% | 0% | 15%* | 0% | 25 | 20% est. |

FR Monomer A = chloroprene; B = dichloroprene; C = pentabromophenyl acrylate; D = 4-chlorostyrene.
$Sb_2O_6$ is micronized antimony trioxide obtained from Laurel Chemicals.
*The DVB used in Example 1D was DVB55 (of 55% purity).

Example 2

Sample A of Example 1 is aged approximately 3 weeks in ambient conditions and shows yellow discoloration on the surface exposed to fluorescent lighting. The LOI value obtained after that period is only 19%. A separate foam is made with the same monomer composition and Chimassorb ™ 944 is added at 0.2% by weight of oil phase. The foam including Chimassorb™ 944 shows much less discoloration over a comparable period and essentially no decline in LOI values. In yet another variation, a HIPE foam is prepared from an oil phase comprising 20% DVB42, 75% chloroprene, 3% antimony trioxide, and 2% 4-methacryloxy-2-hydroxybenzophenone (obtained from Polysciences of Warrington, Pa.). This latter compound is a potent UV absorber which is covalently bonded into the polymer network. This foam also shows good stability to light with respect to discoloration.

Example 3

This example illustrates the application of unreactive flame retardant additives to either the monomer phase preemulsification or to the foam post-curing in a washing step. The emulsion is made as detailed in Comparative Example A. The HIPE foam comprises the monomers 20% DVB55 and 60% styrene. The balance is an unreactive flame retardant agent which is included in the oil phase, as shown Table 3.

TABLE 3

Foam Properties (W:O Ratio 40:1).

| FR Type | FR Additive % | $Sb_2O_6$ % | Density (mg/cc) SW | LOI |
|---|---|---|---|---|
| A | 20 | 5% | 30 | 23.1% |
| B | 20 | 5% | 30 | 23% est. |
| C | 20 | 5% | 30 | 22% est. |

These foams show weight losses in TGA experiments at lower temperatures than the foams wherein the flame retardant additive is covalently bonded (or is polymeric).

Example 4

This example illustrates the consequence of residual salt left in the foam. A foam is prepared using 17% Antiblaze TDCP/LV, 60% styrene, and 20% DVB with 3% antimony trioxide in the oil phase. The wet foam is washed using 10% aqueous potassium phosphate. The resulting product has an LOI estimated at 22%. The residual salt level on the foam is approximately 5% by weight calcium phosphate.

Example 5

This example illustrates the process where the foam is post-treated chemically to confer a flame retardant foam composition. A HIPE foam is prepared at a W:O ratio of 40:1 using a monomer component consisting of 77% isoprene, 3% antimony trioxide, and 20% DVB55. The emulsion is formed at 0–5° C. and is cured under 2 atmospheres of pressure at 65° C. for 48 hours. The resulting foam is dried and washed in water and 2-propanol as described supra. The foam is then exposed to bromine vapors for a period of 24 hours. The resulting foam is isolated and washed again in 2-propanol and dichloromethane to remove residual vapors. The product has an LOI estimate of 23% and a residual bromine content of 50%.

Example 6

The DGMO emulsifier is modified by exposure to bromine. The dibromo-DGMO is purified by column chromatography and is used to prepare an emulsion comprising 20% DVB55, 3% antimony trioxide, and 77% 4-chlorostyrene at a W:O ratio of 40:1. The resulting foam has an LOI estimate value of 25%.

What is claimed is:

1. A process for obtaining a flame retardant, open-celled polymeric foam having an Limiting Oxygen Index (LOI) value of at least about 21%, the process comprising the steps of:
   (A) forming a water-in-oil emulsion from:
      (1) an oil phase comprising:
         (a) from about 80% to about 98%, by weight of the oil phase, of a monomer component comprising:
            (i) from about 0% to about 90%, by weight of the monomer component, of a substantially water-insoluble, monofunctional monomer capable of forming a homopolymer having a Tg of about 40° C. or less;
            (ii) from about 0% to about 70%, by weight of the monomer component, by weight of a substantially water-insoluble, monofunctional comonomer capable of imparting toughness about equivalent to that provided by styrene;
            (iii) from about 5% to about 50%, by weight of the monomer component, of a first substantially water-insoluble, polyfunctional crosslinking agent selected from the group consisting of divinyl benzene and analogs thereof; and
            (iv) from about 0% to about 20%, by weight of the monomer component, of a second substantially water-insoluble, polyfunctional crosslinking agent selected from the group consisting of diacrylates and dimethacrylates of diols and analogs thereof; and
         (b) from about 2% to about 20%, by weight of the oil phase, of an emulsifier component which is soluble in the oil phase and which is suitable for forming a stable water-in-oil emulsion;
      (2) a water phase comprising from about 0.1% to about 20%, by weight of the water phase, of a water-soluble electrolyte;
      (3) a volume to weight ratio of water phase to oil phase of at least about 3:1; and
      (4) wherein the emulsion comprises one or more components which confer flame retardancy to the polymeric foam, wherein the one or more components are included at a level of at least about 5%, by total weight of the oil phase; and (B) polymerizing the monomer component in the oil phase of the water-in-oil emulsion to form the polymeric foam material.

2. The process of claim 1 wherein the one or more components that confer flame retardancy each comprise one or more of the elements chlorine, bromine, antimony, phosphorus, or boron.

3. The process of claim 2 wherein the monomer component of the oil phase of the emulsion comprises at least about 5% by weight of a monomer comprising an element selected from the group consisting of chlorine, bromine, antimony, phosphorus, boron, and mixtures thereof.

4. The process of claim 3 wherein the polymerizable monomer which contains one or more of the elements chlorine, bromine, antimony, phosphorus, or boron is selected from the group consisting of 2-chloro-1,3-butadiene (chloroprene); 2,3-dichloro-1,3-butadiene (dichloroprene); isomers of chlorostyrene, dichlorostyrene, and trichlorostyrene; octachlorostyrene; pentabromophenyl acrylate; pentabromophenyl methacrylate; isomers of bromostyrene, dibormostyrene, and tribromostyrene; 1,3-dibromopropyl acrylate; 2,4,6-tribromophenyl acrylate; 2-bromo-1,3-butadiene (bromoprene); 2,3-dibromo-1,3-butadiene (dibromoprenc); 3-6-dichloro- 1 ,3,7-octatriene; vinyldipropyl phosphate; vinyl diphenyl phosphate; tris[styryl] phosphate; vinyl chloride; vinylidene chloride; vinyl bromide; vinylidene bromide; divinyl phenyl phosphate; 2,3-dibromobutan-1,4-diol diacrylate; chlorodivinyl benzene; brominated alkyl acrylates, diacrylates, triacrylates, tetraacrylates and the corresponding methacrylates, acrylamides, methacrylamides, acrylonitriles, and methacrylonitriles thereof; chlorinated alkyl acrylates, diacrylates, triacrylates, tetraacrylates and the corresponding methacrylates, acrylamides, methacrylamides, acrylonitriles, methacrylonitriles thereof; halogenated styrenics; and mixtures thereof.

5. The process of claim 2 wherein the oil phase of the emulsion further comprises suspended antimony trioxide.

6. The process of claim 5 wherein an antioxidant is added to either the emulsion formed in step (A) or to the polymerized foam formed in step (B).

7. The process of claim 2 wherein the volume to weight ratio of water phase to oil phase is at least about 12:1.

8. The process of claim 2 wherein the volume to weight ratio of water phase to oil phase is from about 12:1 to about 85: 1.

9. The process of claim 8 wherein the volume to weight ratio of water phase to oil phase is from about 20:1 to about 50: 1.

10. The process of claim 2 wherein the material that confers flame retardancy is not a polymerizable monomer and is added to the oil phase or the water phase of the emulsion prior to emulsification or prior to polymerization.

11. The process of claim 10 wherein the material that confers flame retardancy is polymeric and is added to the oil phase prior to emulsification.

12. The process of claim 11 wherein the material that confers flame retardancy is selected from the group consisting of polyvinyl chloride; polyvinylidene chloride; polyvinyl bromide; polyvinylidene bromide; poly vinyldiphenyl phosphate; a polymer of a quaternary ammonium having a counterion selected from the group consisting of hexachloroantimonate, phosphate, borate, and mixtures thereof; and mixtures thereof.

13. The process of claim 10 wherein the material that confers flame retardancy is non-polymeric and is added to the emulsion prior to polymerization.

14. The process of claim 13 wherein the material that confers flame retardancy is selected from the group consisting of brominated and chlorinated aliphatic compounds, phosphate and phosphonate esters, borate esters, and mixtures thereof.

15. The process of claim 14 wherein the material that confers flame retardancy is selected from the group consisting of ChloroWaX™, decabromodiphenyl oxide, hexabromocyclododecane, tris[1,3-dichloropropyl] phosphate, bis(2-chloroethyl) 2-chloroethyl phosphonate, and mixtures thereof.

16. The process of claim 10 wherein the oil phase of the emulsion further comprises suspended antimony trioxide.

17. The process of claim 16 wherein an antioxidant, a UV absorbent compound, or a mixture thereof, is added to either the emulsion formed in step (A) or to the polymerized foam formed in step (B).

* * * * *

UNITED STATES PATENT AND TRADEMARK OFFICE
CERTIFICATE OF CORRECTION

PATENT NO.   : 6,160,028
DATED        : December 12, 2000
INVENTOR(S)  : John C. Dyer It is certified that error appears in the above-identified patent and that said Letters Patent is hereby corrected as shown below:

Column 1,
Line 5, please delete "opencelled" and insert therefor -- open-celled --.
Line 24, please delete "retaing" and insert therefor -- retaining --.

Column 5,
Line 4, please delete "eliminiating" and insert therefor -- eliminating --.
Line 40, please delete "Copolymnerizable" and insert therefor -- Copolymerizable --.

Column 6,
Line 5, please delete "butactiene" and insert therefor -- butadiene --.
Line 13, please delete "dibromoprcne" and insert therefor -- dibromoprene --.
Line 14, please delete "octatricne" and insert therefor -- octatriene --.
Line 46, please delete "35".

Column 8,
Line 23, after "J" please insert therefor -- . -- (a period).

Column 9,
Line 56, please delete "inhibition" and insert therefor -- imbibition --.

Column 11,
Line 29, please delete "requirement" and insert therefor -- requirements --.

Column 12,
Line 11, please delete "retardanc," and insert therefor -- retardancy --.

Column 13,
Line 8, after "thereof" please delete "," (the comma) and insert therefor -- ; --
(a semi-colon).

Column 14,
Line 31, please delete "Noncovalently" and insert therefor -- Non-covalently --.

UNITED STATES PATENT AND TRADEMARK OFFICE
CERTIFICATE OF CORRECTION

PATENT NO. : 6,160,028
DATED : December 12, 2000
INVENTOR(S) : John C. Dyer

It is certified that error appears in the above-identified patent and that said Letters Patent is hereby corrected as shown below:

Column 15,
Line 24, please delete "methacrylarnide" and insert therefor -- methacrylamide --.
Line 38, please delete "flanmmability" and insert therefor -- flammability --.

Column 16,
Line 30, please delete "brorninated" and insert therefor -- brominated --.
Line 53, please delete "erich" and insert therefor -- enrich --.

Column 17,
Line 8, please delete "4chloro" and insert therefor -- 4-chloro --.
Line 60, please delete "rigidity" and insert therefor -- rigidify --.

Column 18,
Line 17, please delete both occurrences of "IrgafoS" and insert therefor -- Irgafos --.

Column 22,
Line 22, please delete "RSA-11" and insert therefor -- RSAII --.
Line 42, please delete "3 1°" and insert therefor -- 31° --.
Line 67, please delete "5° C./minute" and insert therefor -- 5° C./minute --.

Column 23,
Line 38, please delete "fbrming" and insert therefor -- forming --.
Line 61, please delete "WIPE" and insert therefor -- HIPE --.

Column 24,
Line 37, please delete "foanis" and insert therefor -- foams --.

UNITED STATES PATENT AND TRADEMARK OFFICE
CERTIFICATE OF CORRECTION

PATENT NO.    : 6,160,028
DATED         : December 12, 2000
INVENTOR(S)   : John C. Dyer It is certified that error appears in the above-identified patent and that said Letters Patent is hereby corrected as shown below:

<u>Column 27,</u>
Line 24, please delete "dibromoprenc" and insert therefor -- dibromoprene --.
Line 24, please delete "1 ,3,7" and insert therefor -- 1,3,7 --.

<u>Column 28,</u>
Line 32, please delete "ChloroWaX$^{TM}$" and insert therefor -- ChloroWax$^{TM}$ --.

Signed and Sealed this

Twenty-eighth Day of January, 2003

JAMES E. ROGAN
*Director of the United States Patent and Trademark Office*